3,138,637
PROCESS FOR RECOVERING ETHYLENEDI-AMINE-TETRAACETIC ACID (EDTA) FROM COPPER-EDTA-ION EXCHANGE EFFLUENT SOLUTIONS
Roald E. Lindstrom, Reno, and J. Oscar Winget, Sparks, Nev., assignors to the United States of America as represented by the Secretary of the Interior
No Drawing. Filed Jan. 9, 1962, Ser. No. 165,261
3 Claims. (Cl. 260—534)
(Granted under Title 35, U.S. Code (1952), sec. 266)

The invention herein described and claimed may be manufactured and used by or for the Government of the United States of America for governmental purposes without the payment of royalties thereon or therefor.

This invention is concerned with a method for recovery of ethylenediamine tetraacetic acid from ion exchange effluent solutions containing copper-ethylenediamine tetraacetic acid complex.

The ion exchange method is commonly used in separation of the rare earth elements. The rare earths are usually obtained from ore concentrates of the oxides and are difficult to separate due to their great chemical similarity. It has been found that the ion exchange method employing a solution of ethylenediamine tetraacetic acid (hereinafter referred to as EDTA) as elutriant or eluting agent is very effective in separating the rare earth elements. Such a process is described in U.S. Patent No. 2,798,789. Due to the great stability of the rare earth-EDTA complexes, the process requires the use of a cation exchange resin having adsorbed thereon a metal ion such as copper$^{II}$ since this ion forms a complex with the EDTA which is more stable than the rare earth-EDTA complexes. In accordance with this procedure the rare earths are first adsorbed on a cation exchange resin bed. This bed is then physically connected with a second cation exchange resin bed having the copper adsorbed thereon. An aqueous EDTA solution is then passed in sequence through the first bed containing the adsorbed rare earths and then through the second bed containing the resin in the cupric cycle. Rare earths are eluted from the first resin bed in the form of the EDTA complexes and these complexes then exchange with the cupric ions in the second resin bed. Water-soluble cupric-EDTA complexes are formed and are swept out of the column. The rare earth species form individual bands in the second column and these bands pass through the column, resulting in a very effective separation of the rare earths into the individual species as elution takes place in the column.

Since the relatively high cost of EDTA contributes to the cost of the already expensive rare earth elements, the recovery of the EDTA for reuse is obviously highly desirable. Processes for recovery which have been attempted in the past have been found to either yield an impure product or to be cumbersome and expensive.

It is therefore an object of the present invention to provide a method for recovery of EDTA from a copper-EDTA complex.

It is a further object to provide an efficient and inexpensive method of recovery of EDTA from an ion exchange effluent solution obtained from a rare earth separation process.

It is a further object to provide an efficient and inexpensive method of recovery of copper from an ion exchange effluent solution obtained from a rare earth separation process.

It is a further object to provide an efficient and inexpensive method of recovery of copper and EDTA from a rare-earth separation process employing the copper-EDTA method.

It has been found according to the present invention that EDTA may be efficiently and economically recovered from an aqueous effluent solution containing the copper-EDTA complex by treatment with high calcium hydrated lime followed by treatment with a mineral acid, sulfuric acid being the preferred acid. The treatment with lime results in the precipitation of cupric hydroxide and formation of soluble EDTA-calcium complex according to the following equation:

$$[Cu-EDTA]^= + Ca(OH)_2 \rightarrow [Ca-EDTA]^= + Ca[Ca-EDTA] + Cu(OH)_2$$

After settling, the filtrate containing the calcium-EDTA complex is recovered by filtration. The calcium-EDTA complex is then broken by addition of sulfuric acid to a pH below 3 since the EDTA will not complex the calcium below a pH of 3. In order to precipitate the EDTA for subsequent recovery, the pH should be lowered to approximately 1.5 to 2.0 by addition of the sulfuric acid. For good yields without excessive use of acid, a pH of approximately 1.9 is preferred. Approximately 3 ml. of 66° Bé sulfuric acid per liter of solution is required to lower the pH to 1.8 to 2.0. Technical or commercial grade sulfuric acid is sufficient inasmuch as any significant impurities are left in solution on precipitation of the EDTA. Other strengths of acid may be used with equally good results.

When using sulfuric acid as the precipitant, the solution containing the precipitated EDTA should not be allowed to digest more than 2 to 6 hours, preferably 2 hours, because after this period of time, calcium sulfate may begin to precipitate. EDTA crystal growths and yields are near optimum when the acid is added quickly while the calcium-EDTA solution is being stirred vigorously. Stirring should continue for 15 to 20 minutes. The EDTA settles rapidly and the filtrate can be decanted or siphoned. A small amount of dry, powdered EDTA may be added after the acid to aid in starting precipitation.

*Examples*

A series of runs were made using 1 liter samples of ion exchange effluent solution containing 4.5 grams EDTA per liter and approximately 1.4 grams (metal basis) copper per liter. Hydrated lime was added to obtain a nominal pH of 11.7. The mixture was allowed to settle and the precipitated $Cu(OH)_2$ removed by filtration. The filtrate was then treated with technical grade 66° Bé. sulfuric acid in the amount of 3 ml. per liter to precipitate the EDTA. The EDTA precipitates were stirred for 15 to 30 minutes and decanted, filtered and washed within 2 hours after adding the sulfuric acid. The temperature was always the ambient temperature of about 75° F. The following EDTA yields and purities were obtained:

| Run No. | EDTA Recovery, Percent Theoretical | Residue After Ignition of EDTA, Percent EDTA Recovery |
|---|---|---|
| 1 | 98.0 | 0.02 |
| 2 | 96.5 | 0.56 |
| 3 | 96.3 | 0.11 |
| 4 | 98.9 | 0.02 |
| 5 | 99 | 0.06 |

Melting points were taken on samples from each recovered batch to identify the recovered material as EDTA. These samples averaged approximately 238° C. with decomposition. A sample of 99+ percent pure EDTA obtained from the Geigy Chemical Corporation also gave a melting point of approximately 238° C.

Any mineral acid may be used in place of the sulfuric acid since the essential requirement is that the acid lower the pH to the proper value. Hydrochloric acid, in addition, has the advantage of eliminating the danger of calcium sulfate precipitating with the EDTA. However, sulfuric acid is the preferred acid since it is the least expensive and gives the most complete recovery of EDTA.

Processed lime (CaO) may be used in place of the hydrated lime with good results. Zn hydroxide may be used in place of the calcium hydroxide; however, it is more expensive and precipitation of the EDTA from the zinc complex is more difficult. Strong bases such as sodium and potassium hydroxide as well as magnesium hydroxide are not effective since the metal ions do not form a strong enough complex with the EDTA.

The hydrated lime is initially employed in an amount of about 3.5 grams per liter of effluent solution, sufficient to provide a pH of about 11.7. This value of pH is necessary in order to effect displacement of copper by calcium due to the difference in solubilities of $Cu(OH)_2$ and $Ca(OH)_2$. At values of pH nearer the neutral point copper will displace calcium in the chelate structure because of its higher stability constant with EDTA. When the precipitated $Cu(OH)_2$ is reused along with fresh $Ca(OH)_2$ as a preciptant as described below, 2.8 grams of $Ca(OH)_2$ per liter of effluent solution is sufficient to effect complete precipitation of the copper. It is also possible to add the $Ca(OH)_2$ in an amount required to react stoichiometrically with the EDTA and then add sodium hydroxide if necessary to adjust the pH to approximately 11.7.

The process is also applicable to copper complexes other than the Cu–EDTA complex, for example, 1,2-diaminocyclohexanetetraacetic acid-copper complex, although in the case of this complex a heating step is required during the precipitation of $Cu(OH)_2$ with the calcium hydroxide. The precipitation starts at about 40° C. and proceeds at a faster rate as the temperature is increased up to the boiling point. The process is also applicable to complexes of copper with nitrilotriacetic acid and ethyleneglycol-bis(2-aminoethyl) ether-N,N,N',N'-tetraacetic acid.

Crystal growth of the $Cu(OH)_2$ for good settling and filtration rates may be enhanced by reusing the precipitated $Cu(OH)_2$ along with fresh $Ca(OH)_2$ as a precipitant instead of discarding the $Cu(OH)_2$ after each precipitation.

The most commonly obtained copper-EDTA solution from ion exchange systems for rare earth separations will have a nominal EDTA concentration of 4.5 grams (dry wt.) per liter, approximately 1.4 grams (metal basis) per liter of copper and a pH of approximately 3.5. However, other solution concentrations will work equally well. The process may be used over any range of concentrations from trace copper up to the maximum solubility of the Cu–EDTA or Ca–EDTA chelates, whichever is less.

It will be understood that various changes and modifications may be made in the embodiments set forth above within the scope of the appended claims without departing from the spirit and scope of this invention.

What is claimed is:

1. A process for the recovery of ethylenediamine-tetraacetic acid from an ion exchange effluent solution obtained from a rare earth separation process, said effluent solution consisting of an aqueous solution of copper-ethylenediamine-tetraacetic acid complex comprising reacting the solution with a material selected from the group consisting of lime and hydrated lime in an amount sufficient to provide a pH of about 11.7 in order to precipitate copper hydroxide and form a soluble calcium-ethylenediamine-tetraacetic acid complex, filtering to separate the copper hydroxide, treating the filtrate with sulfuric acid in an amount sufficient to reduce the pH to below 3 to break the calcium-ethylenediamine-tetraacetic acid complex and precipitate ethylenediamine-tetraacetic acid.

2. The process of claim 1 in which the solution containing the precipitated ethylene diamine-tetraacetic acid is digested for a period of from 2 to 6 hours.

3. The process of claim 1 in which the sulfuric acid is added in an amount sufficient to reduce the pH to about 1.5 to 2.0.

References Cited in the file of this patent

UNITED STATES PATENTS 3,033,214   Bersworth _____ May 8, 1962